United States Patent [19]

Mori et al.

[11] 4,187,737
[45] Feb. 12, 1980

[54] CONTROL MECHANISM FOR HYDRAULIC SYSTEM

[75] Inventors: Ikuo Mori, Komatsu; Kenichi Yoshida, Kanazu, both of Japan

[73] Assignee: Kabushiki Kaisha Komatsu Seisakusho, Tokyo, Japan

[21] Appl. No.: 897,676

[22] Filed: Apr. 19, 1978

[30] Foreign Application Priority Data

Apr. 19, 1977 [JP] Japan .................................. 52-44151

[51] Int. Cl.² ............................................. G05G 9/04
[52] U.S. Cl. ............................... 74/471 XY; 137/636.2
[58] Field of Search .................. 74/471 XY; 137/636.2

[56] References Cited

U.S. PATENT DOCUMENTS

| | | | |
|---|---|---|---|
| 3,131,574 | 5/1964 | Clingerman | 74/471 XY |
| 3,321,990 | 5/1967 | Densmore | 74/471 XY |
| 4,019,401 | 4/1977 | Drone | 74/471 XY |
| 4,027,547 | 6/1977 | Rahman et al. | 137/636.2 X |

*Primary Examiner*—Allan D. Herrmann
*Attorney, Agent, or Firm*—Armstrong, Nikaido, Marmelstein & Kubovcik

[57] ABSTRACT

A control mechanism for hydraulic system having three sets of hydraulic units and single control lever for controlling all said three sets of the units individually or in unison. The control mechanism comprises a stud having a ball fixedly secured to a vehicle frame, a socket mounted on the ball of said stud, a control lever fixedly secured to said socket, first and third ball couplings fixedly secured to said socket in such a manner that the centers of said first and third ball couplings are located on the first reference line passing through the center of the ball of said stud and at right angles to the axis of said control lever, a second ball coupling fixedly secured to said socket in such a manner that the center of said second ball coupling is located on a second reference line passing through the center of the ball of said stud and at right angles to the axis of said control lever and also said first reference line, a motion translation connecting mechanism connected to said third ball coupling, first and second hydraulic units each being connected to said first and second ball bearings, respectively, and a third hydraulic unit connected to said motion translation connecting mechanism.

4 Claims, 4 Drawing Figures

CONTROL MECHANISM FOR HYDRAULIC SYSTEM

BACKGROUND OF THE INVENTION

This invention relates to a control lever means including a single control lever adapted to control or actuate three sets of hydraulic units.

There has heretofore been employed a hydraulic circuit arranged to change variously the posture or the direction of the working machine mounted on a vehicle such as bulldozer or the like and which comprises a plurality of hydraulic cylinders and a plurality of control valves for extending and retracting said hydraulic cylinders, said plurality of control valves being arranged to be selectively changed over by means of a single control lever.

Such conventional control lever means is disadvantageous in that it includes many fulcrums or supporting points in a control lever system extending from a control lever to a plurality of control valves and therefore the control lever has a large idle play due to having a small play at each supporting point so that accurate control cannot be effected due to the consequential increased stroke, and also because of requiring many supporting points, the arrangement becomes complicated and requires many parts and increases the cost for manufacture.

SUMMARY OF THE INVENTION

It is therefore an object of the present invention to provide a control mechanism for hydraulic system having a single control lever for operating three sets of hydraulic units used in a vehicle such as a bulldozer or the like either individually or in unison.

Another object of the present invention is to provide a control mechanism for hydraulic system which is simple in structure and can exhibit an excellent control performance.

In accordance with the present invention, there is provided a control mechanism for hydraulic system of a vehicle which comprises a vehicle frame, a first, a second and a third hydraulic units, a stud member fixedly secured to said vehicle frame, said stud member having a ball formed at one end thereof, a socket means mounted on the ball of said stud member so as to surround the latter, said socket means being adapted to pivot in every direction relative to the ball of said stud member, and a control lever fixedly secured to said socket means, said control lever having a straight portion and an extension reference line of the axis thereof passing through the center of the ball of said stud member. First and third ball coupling means are fixedly secured to said socket means, said first and third ball coupling means being arranged in such a manner that the centers thereof are located on a first crossing reference line passing through the center of the ball of said stud member and at right angles to the extension reference line. Second ball coupling means is also fixedly secured to said socket means, said second ball coupling means being arranged in such a manner that the center thereof is located on a second crossing reference line passing through the center of the ball of said stud member and at right angles to the extension reference line and also the first crossing reference line. First and second connecting rods are provided, each being connected to said first and second ball coupling means, respectively, at upper ends thereof, the lower ends of which being connected to said first and second hydraulic units, respectively. A third connecting rod is connected at its lower end to said third hydraulic unit. A motion translation connecting means is arranged which interconnects said third ball coupling means and said third connecting rod for translating a rotational motion of said third ball coupling means into a linear motion of said third connecting rod.

A manual operation assisting means may be connected to said motion translation connecting means to reduce a manual force required for turning said control lever about said extension reference line. Movement of the control lever in the fore and aft direction will actuate the first connecting rod and the first hydraulic unit while movement of the control lever in a transverse direction will actuate the second connecting rod and the second hydraulic unit. Movement in a diagonal direction will, of course, operate both the first and second connecting rods and their respective hydraulic units.

Since the control lever is pivotally mounted on the ball of said stud member, when the control lever is turned about its axis it will operate the third connecting rod and the third hydraulic unit. The third connecting rod and its hydraulic unit may be operated individually or together with the other two connecting rods and their hydraulic units.

The above and other objects, features and advantages of the present invention will be readily apparent from the following description taken in conjunction with the accompanying drawings.

DETAILED DESCRIPTION OF THE INVENTION

Figure 1:
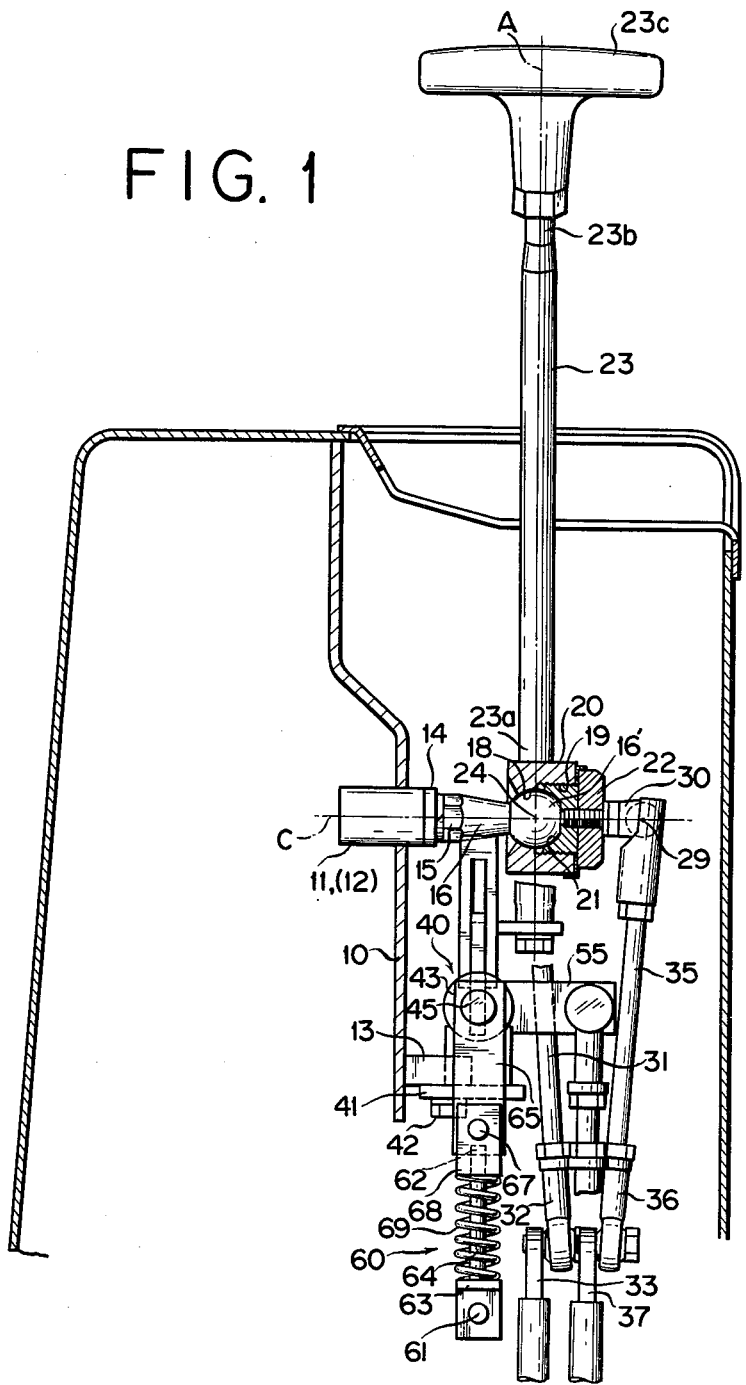
FIG. 1 is a front elevational view partially in cross-section of a control mechanism for hydraulic system according to the present invention.

The present invention will now be described by way of example only with reference to the accompanying drawings.

Reference numeral 10 denotes a supporting plate extending upright and fixedly secured to a base member not shown. The supporting plate 10 has a pair of riding seats 11 and 12 fixedly secured thereto and a bracket 13 extending therefrom. Fixedly secured to the riding seats 11 and 12 by means of bolts 15, 15 is a mounting plate 14. Fixedly secured to the mounting plate 14 by means of a nut 17 is a stud member 16 which projects horizontally. The stud member 16 has a ball 16' formed at one end thereof. Fitted from outside to the ball 16' of the stud member 16 is a square-shaped socket 20 having formed therein a semi-spherical recess 18 and a screw threaded hole 19 having a large diameter, said threaded hole 19 being threadably engaged with a retainer 22 having a semi-spherical recess 12 formed therein so that the socket 20 can be oscillated in every direction and rotated in the horizontal direction.

A bent control lever 23 is fixedly secured to the upper face of the socket 23 at base end 23a thereof in such a manner that the extension reference line "A" of the axis of the straight portion 23b of the control lever passes through the centre 24 of the ball 16' of the stud member 16. A T-shaped gripper 23c is fixedly secured to the leading end of the straight portion 23b of the control lever 23 as an integral part thereof.

Further, threadably and fixedly secured to the left and right hand faces of the socket 20 are a first and a third spherical couplings 27 and 28 having their centers 25 and 26 on a first transverse or crossing axis "B" which extends at right angles to the extension reference line "A" at the centre 24 of the ball 16'. A second spherical coupling 30 having a centre 29 on a second transverse or crossing axis "C" extending at right angles to the extension reference line "A" at the centre 24 of the ball 16' is threadably engaged with or fixedly secured to the rear face of the socket 20.

Threadably engaged with the first spherical coupling 27 is a first valve connecting rod 31 having a spherical bearing member 32 at the lower end thereof which is pivotally connected to a spool 33 of a first control valve.

Threadably engaged with the second spherical coupling 30 is a second valve connecting rod 35 having a spherical bearing member 36 which is pivotally connected to a spool 37 of a second control valve.

Figure 2:
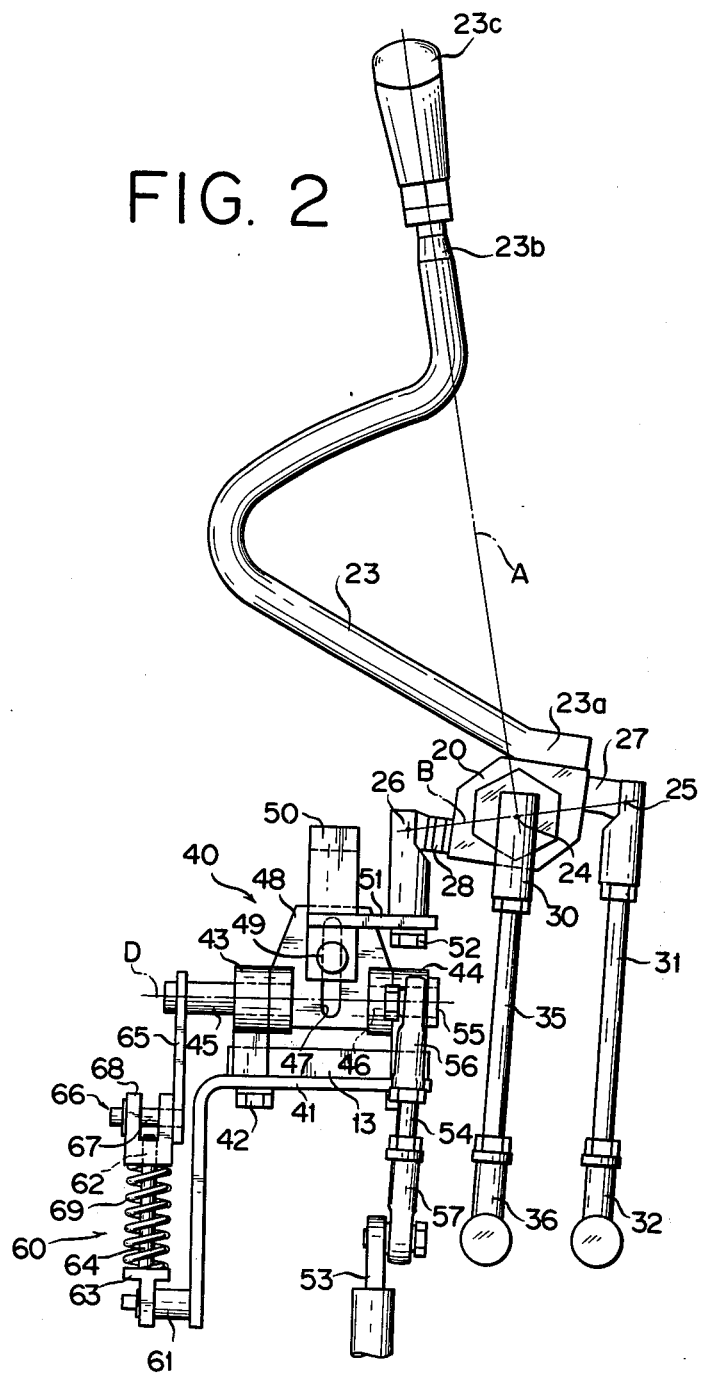
FIG. 2 is a side elevational view of FIG. 1.
Figure 3:
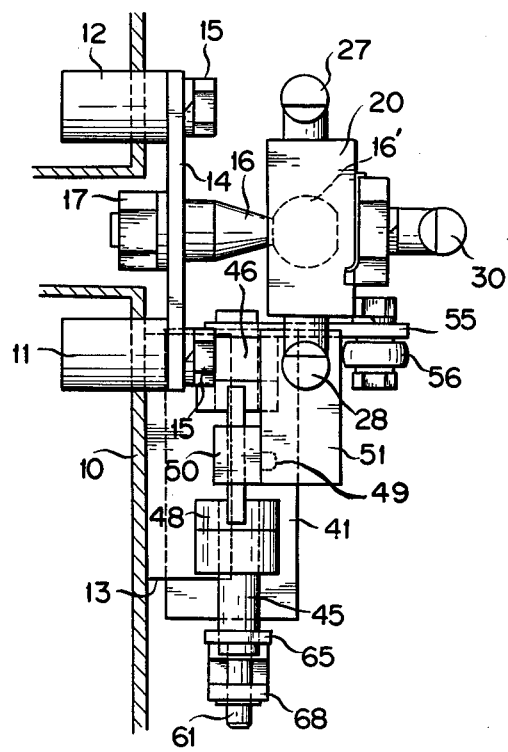
FIG. 3 is a top plan view of FIG. 1.
Figure 4:
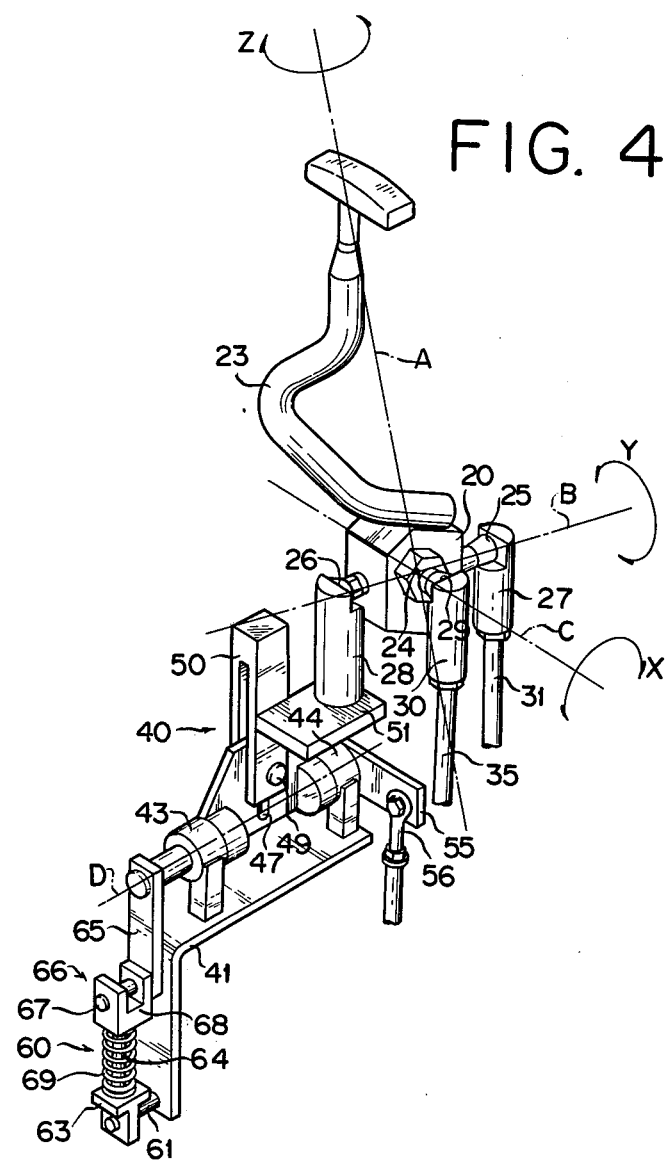
FIG. 4 is a perspective view of a control mechanism for the hydraulic system according to the present invention.

A third spherical coupling 28 is connected to a motion translation connecting means 40. Stating more specifically, an "L"-shaped mounting bracket 41 is detachably fitted to the bracket 13 by means of a bolt 42. A first and a second cylindrical bearing members 43 and 44 are oppositely fixedly secured to the mounting bracket 41. Coaxial shafts 45 and 46 are rotatably mounted in the first and second cylindrical bearing members 43 and 44, and the centre line "D" thereof is parallel with the first crossing axis "B" and extends at right angles to the second crossing axis "C" in FIG. 2.

A vertical connecting plate having an elongated vertical hole 47 formed therein rides and is fixedly secured to the abovementioned shafts 45 and 46. Fitted from outside to the connecting plate 48 is a bifurcated rod 50 having a pin 49 which is idly or loosely fitted in the elongated hole 47. Horizontally fixedly secured to the bifurcated rod 50 is a connecting plate 51 which is fixedly secured to the third spherical coupling 28 by means of a bolt 52.

Further, fixedly secured to the above-mentioned shaft 46 is a lever 55, the leading end of which is connected through a fourth spherical coupling 56 to a third valve connecting rod 54 which is pivotally connected through a spherical bearing member 57 to a valve rod or spool 53 of a third control valve.

A manual operation assisting means 60 is providing between the above-mentioned shaft 45 and the mounting bracket 41. Stated more specifically, a fixed fulcrum bracket 61 is fixedly secured to the mounting bracket 41, and a guide rod 64 having a screw threaded portion 62 and a spring retainer or carrier 63 is pivotally mounted on the fixed fulcrum bracket 61. Further, fixedly secured to the shaft 45 is a lever 65 which is connected to a resilient, articulated fulcrum 66 comprising a pivot pin 67 and a spring retainer 68. A compression spring 69 is provided between the spring retainer 68 of the resilient, articulated fulcrum 66 and the spring retainer 63 of the aforesaid guide rod 64. The guide rod 64, the spring retainer 68 and the lever 65 are usually arranged by the compression spring 69 on a straight line.

Further, a spring located in the third control valve for returning the valve to its neutral position, though not shown in the drawing, has a stronger resiliency than the force of the compression spring 69 to move the valve rod or spool 53.

The operation according to the present invention will now be described below.

When the control lever 23 is rotated about the second crossing axis "C" (or in the direction shown by arrow "X"), the socket 20 is rotated about the second crossing axis "C" and along the spherical surface of the ball 16' thereby moving the first valve connecting rod 31 vertically so as to change over the first control valve through the valve rod or spool 33. Moreover, the third spherical coupling 28 is also moved up and down; however, because the pin 49 can be moved up and down along the elongated hole 47, only the bifurcated rod is moved up and down and so the third control valve can not be changed over.

Since at that time the centre 29 of the second spherical coupling 30 is located on the second crossing axis "C", the second spherical coupling 30 is not moved up and down, and therefore the second control valve will not be changed over.

Further, when the control lever 23 is moved about the first crossing axis "B" (or in the direction shown by arrow "Y"), the second valve connecting rod 35 will be moved up and down as mentioned above thereby changing over the second control valve through the valve rod or spool 37.

Since at that time the centres 25 and 26 of the first and third spherical joints or couplings 27 and 28 are located on the first crossing axis "B", the couplings 27 and 28 will not be oscillated vertically so that the first and third control valves will not be subjected to change-over controls.

Next, if the control lever 23 is turned about the extension reference line "A" (or in the direction shown by arrow "Z"), the socket 20 will be turned along the spherical surface of the ball 16' of the stud member 16 thereby moving the third spherical coupling 28 circumferentially. As a result, the connecting plate 48 is oscillated about the axis "D" through the connecting plate 51 and the bifurcated rod 50 thereby changing over the third control valve through the shaft 46, the lever 55, the fourth spherical coupling 56, the third valve connecting rod 54, the spherical bearing member 57 and the valve rod or spool 53. On the other hand, when the connecting plate 48 is oscillated to rotate the shaft 45, the lever 65 is oscillated so that the pin 67 can get out of the place on the straight line connecting the shaft 45 and the fixed fulcrum bracket 61. Consequently, the lever 65 will be oscillated by the compression spring 69 and therefore the manipulating force required for the control lever 23 can be substantially reduced.

At that time, rotation of the socket 20 will move the first and second spherical couplings 27 and 30 circumferentially; however, such movements can be absorbed to some extent by the length of the first and second valve connecting rods 31 and 35 and so the vertical movement of the valve rods or spools 33 and 37 becomes very small. Further, since the first and second control valves are designed so as not to be changed over even if the valve rods or spools 33 and 37 are moved slightly in the vertical direction, the first and second control valves will not be subjected to change-over controls.

As mentioned hereinbefore, the first, second and third control valves can be changed over independently or continuously or at the same time by oscillating or turning a single control lever 23 in the two directions extending at right angles to each other.

Further, when the control lever 23 is turned, the manual operation assisting means 60 is actuated to reduce the force required for manipulating the lever.

Further, since each of the pivotal connections comprises a spherical bearing, the number of the fulcrums or supporting points can be reduced to minimize the idle play so that accurate change-over controls can be effected and the construction per se can be simplified, and as a result, the cost of the control mechanism can be reduced so much.

Moreover, since the ball 16' of the stud member 16 and the socket 20 are connected by the retainer 22, the clearance of the mated spherical surfaces can be adjusted by adjusting the retainer 22 and so that the idle play of the control lever 23 can be minimized.

While the invention has been described and shown with particular reference to the preferred embodiment, it will be apparent that variations might be possible that would fall within the scope of the present invention, which is not intended to be limited except as defined in the following claims.

What is claimed is:

1. A control mechanism for hydraulic system comprising a frame, a stud member fixedly secured to said frame, said stud member having a ball formed at one end thereof, a socket means mounted on the ball of said stud member encircling thereof, said socket means being adapted to pivot in every direction relative to the ball, a control lever fixedly secured to said socket means, said control lever having a straight portion and an extension reference line of the axis thereof passing through the center of the ball of said stud member, first and third ball coupling means fixedly secured to said socket means, said first and third ball coupling means being arranged in such a manner that the centers thereof are located on a first crossing reference line passing through the center of the ball of said stud member and at right angles to the extension reference line, second ball coupling means fixedly secured to said socket means, said second ball coupling means being arranged in such a manner that the center thereof is located on a second crossing reference line passing through the center of the ball of said stud member and at right angles to the extension reference line and also the first crossing reference line, first and second connecting rods, each being connected to said first and second ball coupling means, respectively, at upper ends thereof, the lower ends of which being connected to first and second control valves, respectively, a third connecting rod connected at its lower end to a third control valve, and motion translation connecting means interconnecting said third ball coupling means and said third connecting rod for translating a rotational motion of said third ball coupling means into a linear motion of said third connecting rod.

2. A control mechanism of claim 1, further comprising manual operation assisting means connected to said motion translation connecting means for reducing a manual force required for turning said control rod.

3. A control mechanism of claim 1 or 2 wherein said motion translation connecting means comprises a bracket fixedly secured to said frame, first and second cylindrical bearing members fixedly secured to said bracket, first and second shafts rotatably mounted within said first and second cylindrical bearing members, respectively, the axes of said first and second shafts being located on the same straight line, a connecting plate mounted on said first and second shafts, said connecting plate having an elongated vertical hole formed therein, a bifurcated member having a pin slidably mounted on said connecting plate so that the pin can be engaged with the elongated hole of said connecting plate, said bifurcated member being fixedly secured to said third ball coupling means, and a fourth ball coupling means mounted on said second shaft, said fourth ball coupling means being connected to said third connecting rod.

4. A control mechanism of claim 2 wherein said manual operation assisting means comprises a guide rod having spring retainers formed at both ends thereof, one of said spring retainers being fixedly secured to said frame, a lever fixedly secured to said motion translation connecting means at one end thereof, the other end of said lever being pivotally connected to the other spring retainers, and spring means mounted around said guide rod between said spring retainers.

* * * * *